(12) United States Patent
Wilcynski et al.

(10) Patent No.: US 10,696,410 B2
(45) Date of Patent: Jun. 30, 2020

(54) SEAT ASSEMBLY HAVING A DEPLOYABLE HEADREST

(71) Applicant: THE BOEING COMPANY, Chicago, IL (US)

(72) Inventors: Paul Joseph Wilcynski, Seattle, WA (US); Ethan Lee, Bellevue, WA (US); Chevy Ho, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 58 days.

(21) Appl. No.: 15/975,829

(22) Filed: May 10, 2018

(65) Prior Publication Data

US 2019/0344896 A1 Nov. 14, 2019

(51) Int. Cl.
*B64D 11/06* (2006.01)
*B60N 2/874* (2018.01)
*B60N 3/00* (2006.01)

(52) U.S. Cl.
CPC ...... *B64D 11/0642* (2014.12); *B64D 11/0638* (2014.12); *B60N 2/874* (2018.02); *B60N 3/004* (2013.01)

(58) Field of Classification Search
CPC ............ B64D 11/0642; B64D 11/0647; B64D 11/00151; B60N 2/874; B60N 2/80
See application file for complete search history.

(56) References Cited

U.S. PATENT DOCUMENTS

| 3,888,329 | A | * | 6/1975 | Monaghan | ............... | B60R 21/02 280/734 |
| 4,637,629 | A | | 1/1987 | Cummings | | |
| 4,667,904 | A | | 5/1987 | Herndon et al. | | |
| 4,784,352 | A | | 11/1988 | Smith et al. | | |
| 4,899,961 | A | | 2/1990 | Herndon | | |
| 5,046,687 | A | | 9/1991 | Herndon | | |
| 5,364,164 | A | * | 11/1994 | Kuranami | ................ | A47C 7/38 297/408 |
| 6,619,733 | B2 | | 9/2003 | Pearson | | |
| 6,805,403 | B2 | * | 10/2004 | Buch | ........................ | B60N 3/00 297/146 |
| 6,814,404 | B2 | | 11/2004 | Jensen | | |
| 8,528,970 | B2 | * | 9/2013 | Edalati | ................ | A47C 20/026 297/163 |

(Continued)

FOREIGN PATENT DOCUMENTS

| EP | 2483104 | 8/2012 |
| GB | 1335982 | 10/1973 |

(Continued)

OTHER PUBLICATIONS

Extended European Search Report for EP 19173450.8-1010, dated Jul. 29, 2019.

*Primary Examiner* — David R Dunn
*Assistant Examiner* — Tania Abraham
(74) *Attorney, Agent, or Firm* — The Small Patent Law Group LLC; Joseph M. Butscher (57) ABSTRACT

A seat assembly includes a seat cushion, a backrest, and a headrest moveably coupled to a back of the backrest. The headrest is configured to be moved between a stowed position in which the headrest is retained within a portion of the backrest and a deployed position in which the headrest is configured to support a passenger in a forward resting position.

20 Claims, 9 Drawing Sheets

(56) References Cited

U.S. PATENT DOCUMENTS

| | | | |
|---|---|---|---|
| 8,850,642 B2 * | 10/2014 | Rasmussen | A47G 9/1027 |
| | | | 297/398 |
| 8,985,693 B2 | 3/2015 | Purpura et al. | |
| 10,052,991 B2 * | 8/2018 | Chen | B60N 2/90 |
| 2013/0106163 A1 | 5/2013 | Purpura | |
| 2013/0341367 A1 | 12/2013 | Purpura | |
| 2017/0066354 A1 * | 3/2017 | Veneruso | B60N 2/882 |
| 2017/0096224 A1 * | 4/2017 | Marom | B64D 11/0642 |
| 2018/0022250 A1 * | 1/2018 | Lev | A47C 7/386 |
| | | | 297/399 |

FOREIGN PATENT DOCUMENTS

| | | | | |
|---|---|---|---|---|
| GB | 2132479 A | * | 7/1984 | B64D 11/06 |
| WO | WO 2011/070515 | | 6/2011 | |

* cited by examiner

SEAT ASSEMBLY HAVING A DEPLOYABLE HEADREST

FIELD OF EMBODIMENTS OF THE DISCLOSURE

Embodiments of the present disclosure generally relate to interior cabins within vehicles, such as commercial aircraft, and, more particularly, to seat assemblies within interior cabins of vehicles.

BACKGROUND OF THE DISCLOSURE

Commercial aircraft typically include an interior cabin that may be divided into numerous sections. A cockpit is generally separated from a passenger cabin, which may include a first class section, a business class section, and a coach section. The passenger cabin may also include one or more work areas for flight personnel, such as galleys, which may include food and beverage storage structures. One or more aisles pass through the passenger cabin and connect each of the passenger sections to one or more paths and/or one or more doors of the aircraft.

Passenger seats are positioned within the interior cabin. During a flight, particularly a long haul flight, a passenger seated within a seat may decide to rest. A rear portion of a head of a passenger may be supported on a front of a backrest.

However, the passenger may prefer to rest in a different position. The passenger may prefer to rest in a forward position, such that the head of the passenger abuts into a rear surface of a backrest of a seat in front of the passenger. As another example, the passenger may support the head over a deployed tray table.

As can be appreciated, however, such positions may not always be ergonomically comfortable, particularly over the entire course of a long haul flight. Moreover, certain passengers may be reluctant to contact a rear of a seat and/or a tray table, due to a lack of comfort and/or perceived levels of cleanliness (or lack thereof).

SUMMARY OF THE DISCLOSURE

A need exists for a seat assembly onboard a vehicle that allows a passenger to comfortably rest in a forward resting position. Further, a need exists for a seat assembly having a comfortable and clean deployable headrest.

With those needs in mind, certain embodiments of the present disclosure provide a seat assembly that includes a seat cushion, a backrest, and a headrest moveably coupled to a back of the backrest. The headrest is configured to be moved between a stowed position in which the headrest is retained within a portion of the backrest and a deployed position in which the headrest is configured to support a passenger in a forward resting position.

The headrest in the stowed position may be retained within an envelope of the backrest. As an example, the headrest in the stowed position may be flush mounted with the back of the backrest. In at least one embodiment, the headrest in the stowed position is retained within a reciprocal retaining chamber formed in the back of the backrest.

The headrest may be moveably coupled to an upper portion of the back of the backrest. In at least one embodiment, the headrest includes a head support beam that spans between opposed lateral pivot beams. The head support beam may extend between upper ends of the lateral pivot beams. Lower ends of the lateral pivot beams may be pivotally coupled to the back of the backrest. The seat assembly may also include a moveable latch that securely retains the headrest in the stowed position.

An electronic device may be secured within the back of the backrest. The headrest in the stowed position may extend around one or more portions of an electronic device.

A tray table may be moveably coupled to the back of the backrest. In at least one embodiment, the tray table is positioned below the headrest.

The headrest may include a padded insert. The padded insert may be removably secured to a retaining bracket. An antimacassar may be removably secured to the padded insert. In at least one embodiment, the padded insert is configured to be radially shifted relative to a head support beam of the headrest.

Certain embodiments of the present disclosure provide a method of forming a headrest of a seat assembly. The method includes moveably coupling the headrest to the seat assembly, such as moveably coupling the headrest to a back of the backrest of the seat assembly. The moveably coupling allows the headrest to be moved between a stowed position in which the headrest is retained within a portion of the backrest and a deployed position in which the headrest is configured to support a passenger in a forward resting position. The method may also include retaining the headrest in the stowed position within an envelope of the backrest.

Certain embodiments of the present disclosure provide a vehicle that includes an interior cabin, and a seat assembly within the interior cabin, as described herein.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide a seat assembly, such as may be used within an interior cabin of a vehicle, which includes a deployable headrest. The headrest is moveably secured to a back of a backrest of the seat assembly. The headrest is configured to be moved between a stowed position and a deployed position. In the deployed position, the headrest is configured to comfortably support a passenger in a forward resting position.

In at least one embodiment, the headrest fits within an existing seat envelope. For example, in the stowed position, the headrest may be flush-mounted with the backrest. The headrest is compact and light, and allows passengers to lean forward in a comfortable resting position.

The headrest is deployable from the seat assembly in front of a passenger seated in another seat assembly, thereby allowing for a forward resting position. The headrest in the stowed position may be housed within an envelope of the backrest.

Certain embodiments of the present disclosure provide a seat assembly that includes a backrest having an upper portion and a lower portion. The upper portion includes an electronic device and the lower portion includes a tray table. The upper portion includes a deployable headrest that is rearwardly deployable such that a passenger in an adjacent row is able to utilize the deployable headrest. The headrest may be rotatably attached to the upper portion. The headrest may be semi-circumferentially located relative to the electronic device in a stowed position. The headrest is ergonomically adjustable when in a deployed position. In at least one embodiment, the electronic device is an in-flight entertainment (IFE) system.

The headrest may include a padded portion and an antimacassar. The antimacassar is removable and/or replaceable.

Certain embodiments of the present disclosure provide a method of manufacturing a seat including providing a seat with a backrest having an upper portion and a lower portion, and pivotally coupling a moveable headrest to the upper portion.

Figure 1:
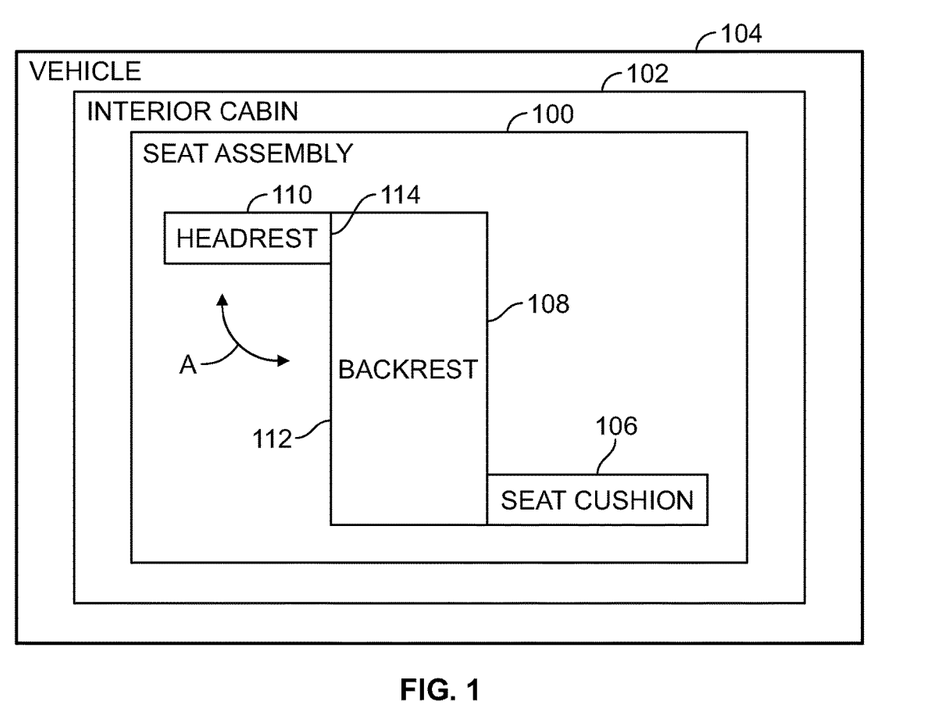
FIG. 1 illustrates a schematic block diagram of a seat assembly within an interior cabin of a vehicle, according to an embodiment of the present disclosure.

FIG. 1 illustrates a schematic block diagram of a seat assembly 100 within an interior cabin 102 of a vehicle 104, according to an embodiment of the present disclosure. The vehicle 104 may be a commercial aircraft, for example.

The seat assembly 100 includes a seat cushion 106 and a backrest 108. A headrest 110 is moveably coupled to a rear or back 112 of the backrest 108. In at least one embodiment, the headrest 110 is moveably coupled to an upper portion 114 of the back 112 of the backrest 108.

The headrest 110 is configured to move in the directions of arc A between a deployed position and a stowed position relative to the backrest 108. For example, the headrest 110 may be pivotally coupled to the backrest 108. In the deployed position, the headrest 110 rearwardly extends from the back 112 of the backrest 108. In the deployed position, the headrest 110 is configured to support a head of a passenger in a forward resting position. The passenger is seated in an adjacent seat assembly behind the seat assembly 100. Thus, the passenger may move the headrest 110 into the deployed position and rest in the forward resting position with the headrest 110 supporting the face of the passenger.

In the stowed position, the headrest 110 is retained within the back 112 of the backrest 108. For example, the passenger may pivot the headrest 110 into a retaining chamber of the backrest 108. In the stowed position, the headrest 110 may not protrude outwardly past the back 112 of the backrest 108. Instead, the headrest 110 in the stowed position may be flush-mounted with the back 112 of the backrest 108. As such, the headrest 110 in the stowed position is not susceptible to catching or snagging articles within the interior cabin 102.

Figure 2:
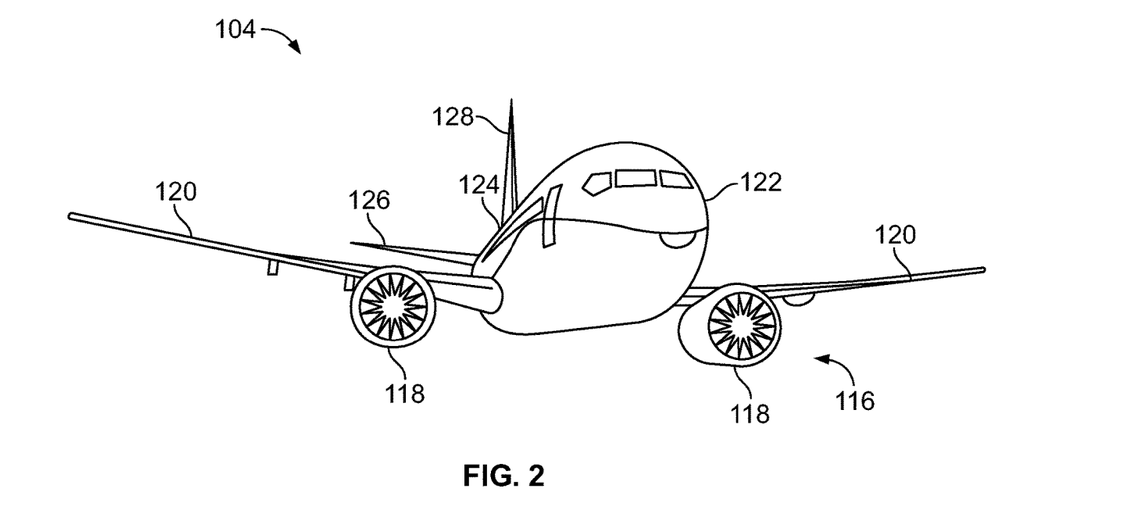
FIG. 2 illustrates a front perspective view of an aircraft, according to an embodiment of the present disclosure.

FIG. 2 illustrates a front perspective view of a vehicle, such as an aircraft 104, according to an embodiment of the present disclosure. The aircraft 104 includes a propulsion system 116 that may include two turbofan engines 118, for example. Optionally, the propulsion system 116 may include more engines 118 than shown. The engines 118 are carried by wings 120 of the aircraft 104. In other embodiments, the engines 118 may be carried by a fuselage 122 and/or an empennage 124. The empennage 124 may also support horizontal stabilizers 126 and a vertical stabilizer 128.

The fuselage 122 of the aircraft 104 defines an interior cabin, which may include a cockpit, one or more work sections (for example, galleys, personnel carry-on baggage areas, and the like), one or more passenger sections (for example, first class, business class, and coach sections), and an aft section. Alternatively, instead of an aircraft, embodiments of the present disclosure may be used with various other vehicles, such as automobiles, buses, locomotives and train cars, seacraft, spacecraft, and the like.

Figure 3:
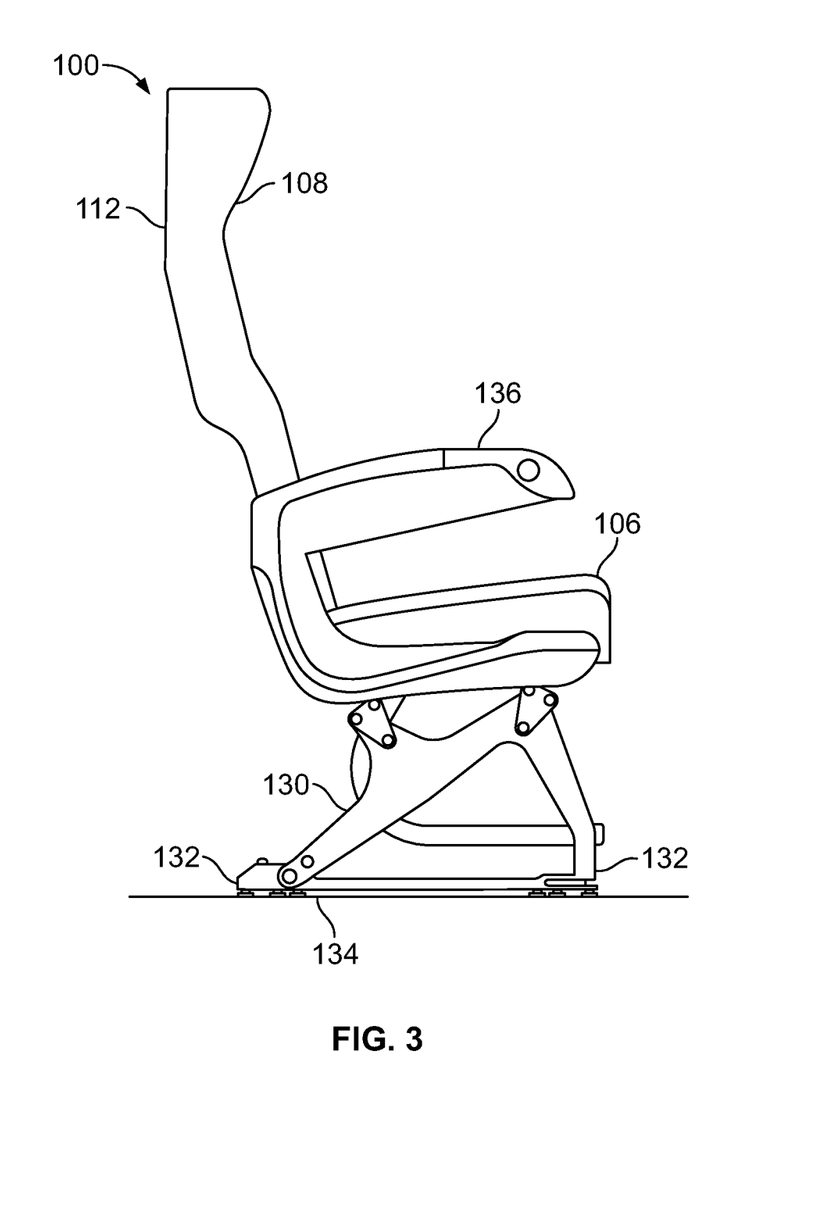
FIG. 3 illustrates a side view of a seat assembly, according to an embodiment of the present disclosure.

FIG. 3 illustrates a side view of a seat assembly 100, according to an embodiment of the present disclosure. The seat assembly 100 may be configured to be secured within a cabin of a vehicle, such as a commercial aircraft.

The seat assembly 100 includes a base 130, which may include legs 132 that may be secured to tracks 134 within a cabin of a vehicle. The legs 132 may include fittings, fasteners, or the like that are configured to securely connect the legs 132 to the tracks 134. The base 130 supports a seat cushion 106 and a backrest 108. Arm rests 136 may be pivotally secured to the backrest 108.

As described herein, the headrest 110 (shown in FIG. 1) is moveably secured to a back 112 of the backrest 108, such as through lateral arms that are pivotally secured to the backrest 108. Additionally, a tray table may also be pivotally secured to the back 112 of the backrest 108.

Figure 4:
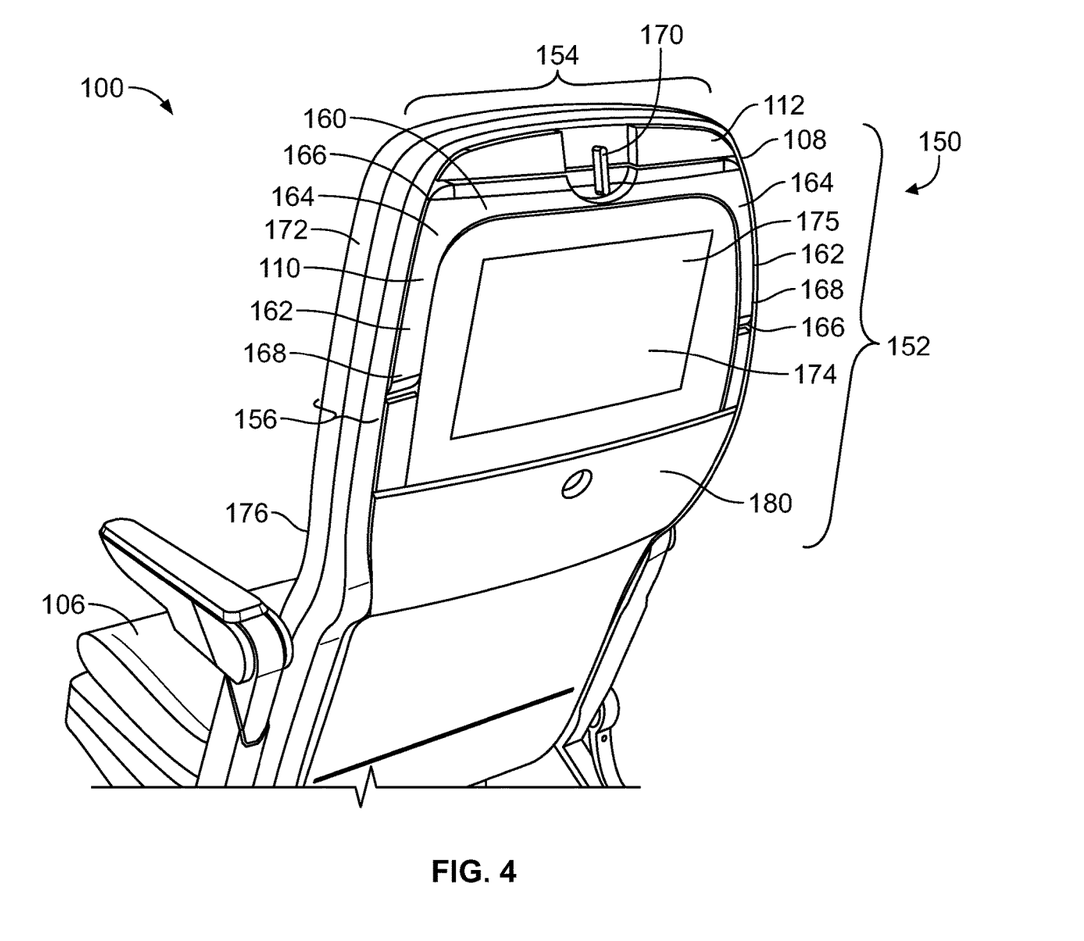
FIG. 4 illustrates a perspective rear view of a seat assembly, according to an embodiment of the present disclosure.
Figure 5:
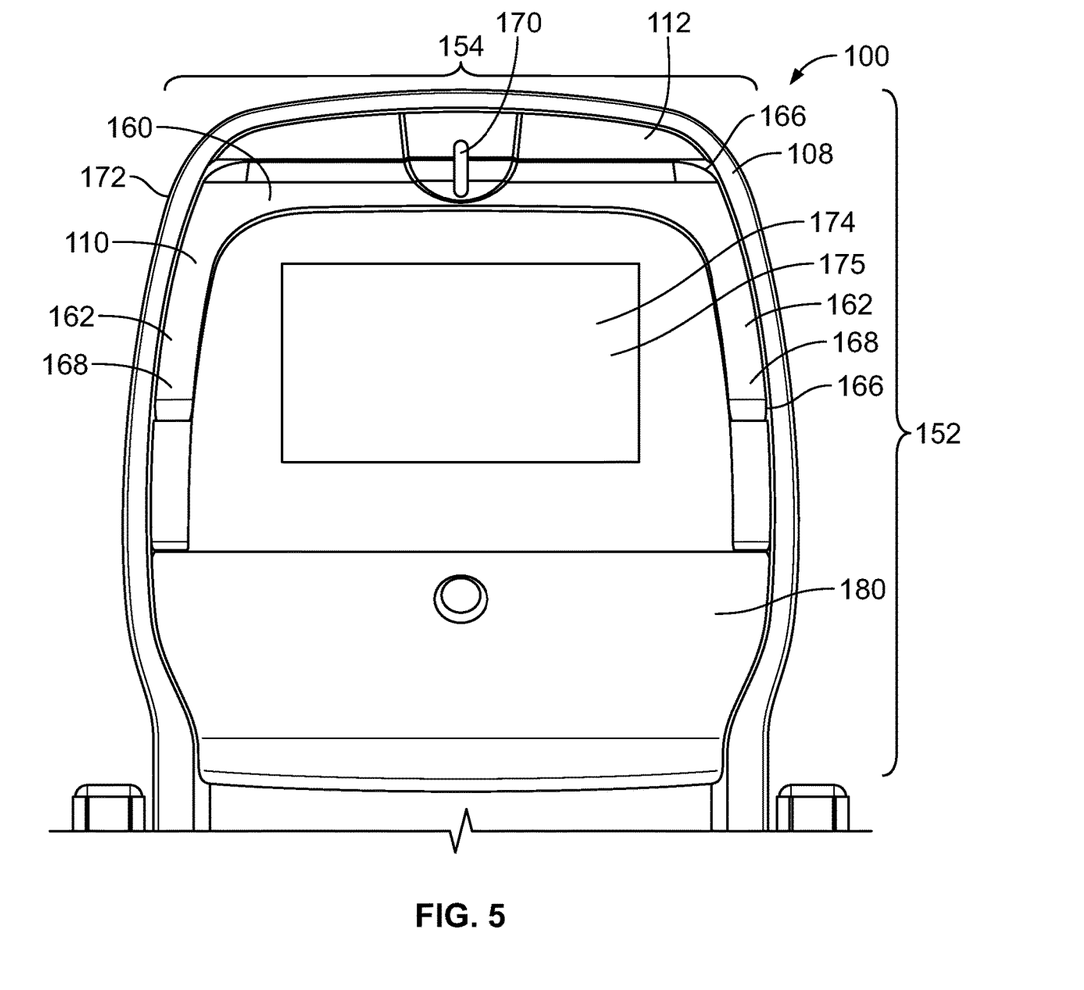
FIG. 5 illustrates a rear view of a backrest of a seat assembly, according to an embodiment of the present disclosure.

FIG. 4 illustrates a perspective rear view of the seat assembly 100, according to an embodiment of the present disclosure. FIG. 5 illustrates a rear view of the backrest 108 of the seat assembly 100. Referring to FIGS. 4 and 5, the headrest 110 is shown in a stowed position. The headrest 110 may be flush-mounted with the backrest 108 in the stowed position. In particular, in the stowed position, the headrest 110 may be contained within an envelope 150 of the backrest 108 defined by a height 152, a width 154, and a thickness 156 of the backrest 108. In the stowed position, no portion of the headrest 110 may protrude outwardly past the height 152, the width 154, or the thickness 156 of the backrest 108. Alternatively, at least a portion of the headrest 110 in the stowed position may outwardly extend past at least a portion of the envelope 150 of the backrest 108.

The headrest 110 includes a head support beam 160 that spans between opposed lateral pivot beams 162. For example, the head support beam 160 may extend between upper ends 164 of the lateral pivot beams 162. As shown, the head support beam 160 may be generally perpendicular to the lateral pivot beams 162.

In the stowed position, the headrest 110 is retained within a reciprocal retaining chamber 166 formed in the back 112 of the backrest 108. Lower ends 168 of the lateral pivot beams 162 are pivotally coupled to reciprocal structures within the back 112 of the backrest 108. For example, the lower ends 168 may include pivot pins that are pivotally retained within reciprocal bearings and/or openings within the back 112 of the backrest 108, or vice versa.

A moveable latch 170 securely retains the headrest 110 in the stowed position. The latch 170 may be pivoted into a release position, in which the latch 170 disengages from the head support beam 160 to allow the headrest 110 to be downwardly pivoted into a deployed position.

As shown, the headrest 110 is moveably coupled to an upper portion 172 of the back 112 of the backrest 108. The headrest 110 in the stowed position may extend around one or more portions of an electronic device 174 secured within the back 112 of the backrest 108. For example, the head support beam 160 is positioned over the electronic device 174, while the lateral pivot beams 162 are positioned to sides of the electronic device 174. In at least one embodiment, the electronic device 174 may be a monitor, such as a monitor of an in-flight entertainment (IFE) system 175.

A tray table 180 may be moveably coupled to a lower portion 176 of the back 112 of the backrest 108. The tray table 180 may be positioned underneath the electronic device 174. As shown in FIGS. 4 and 5, the tray table is in a stowed position.

Alternatively, the seat assembly 100 may not include the electronic device 174. In at least one other embodiment, the tray table 180 may extend to the upper portion 172 of the backrest 108. In this embodiment, the latch 170 may be used to securely latch the headrest 110 and the tray table 180 in stowed positions.

The headrest 110 is independent of the tray table 180 and the electronic device 174. That is, the headset 110 is deployable without affecting the use of the tray table 180 and the electronic device 174, and vice versa.

Figure 6:
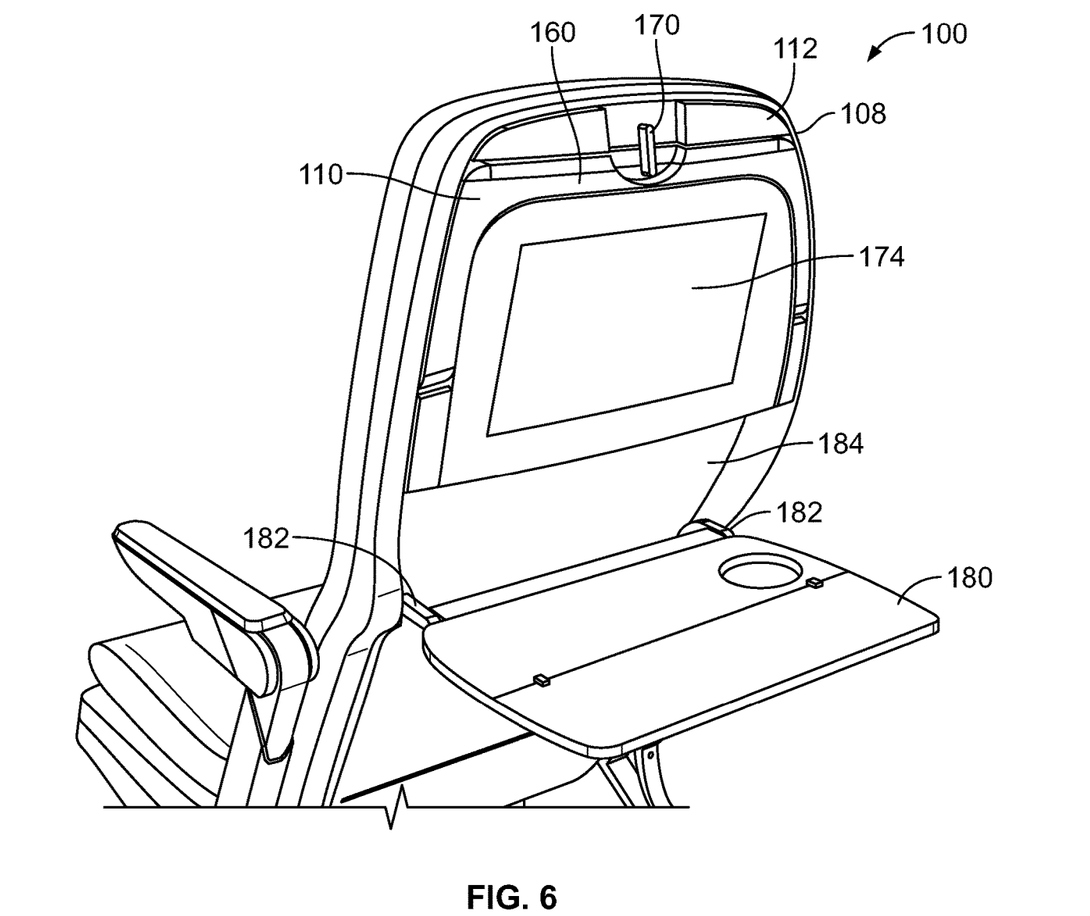
FIG. 6 illustrates a perspective rear view of a seat assembly having a headrest in a stowed position and a tray table in a deployed position, according to an embodiment of the present disclosure.

FIG. 6 illustrates a perspective rear view of the seat assembly 100 having the headrest 110 in the stowed position and the tray table 180 in a deployed position, according to an embodiment of the present disclosure. The latch 170 engages a rear surface of the head support beam 160 to securely retain the headrest 110 in the stowed position. The tray table 180 may outwardly unfold into the deployed position. Lateral pivot arms 182 may pivotally couple the tray table 180 to the lower portion 176 of the back 112 of the backrest 108. In order to move the tray table 180 into a stowed position (as shown in FIGS. 4 and 5), the tray table 180 may be folded up and pivoted into a reciprocal retaining chamber 184 underneath the electronic device 174.

Figure 7:
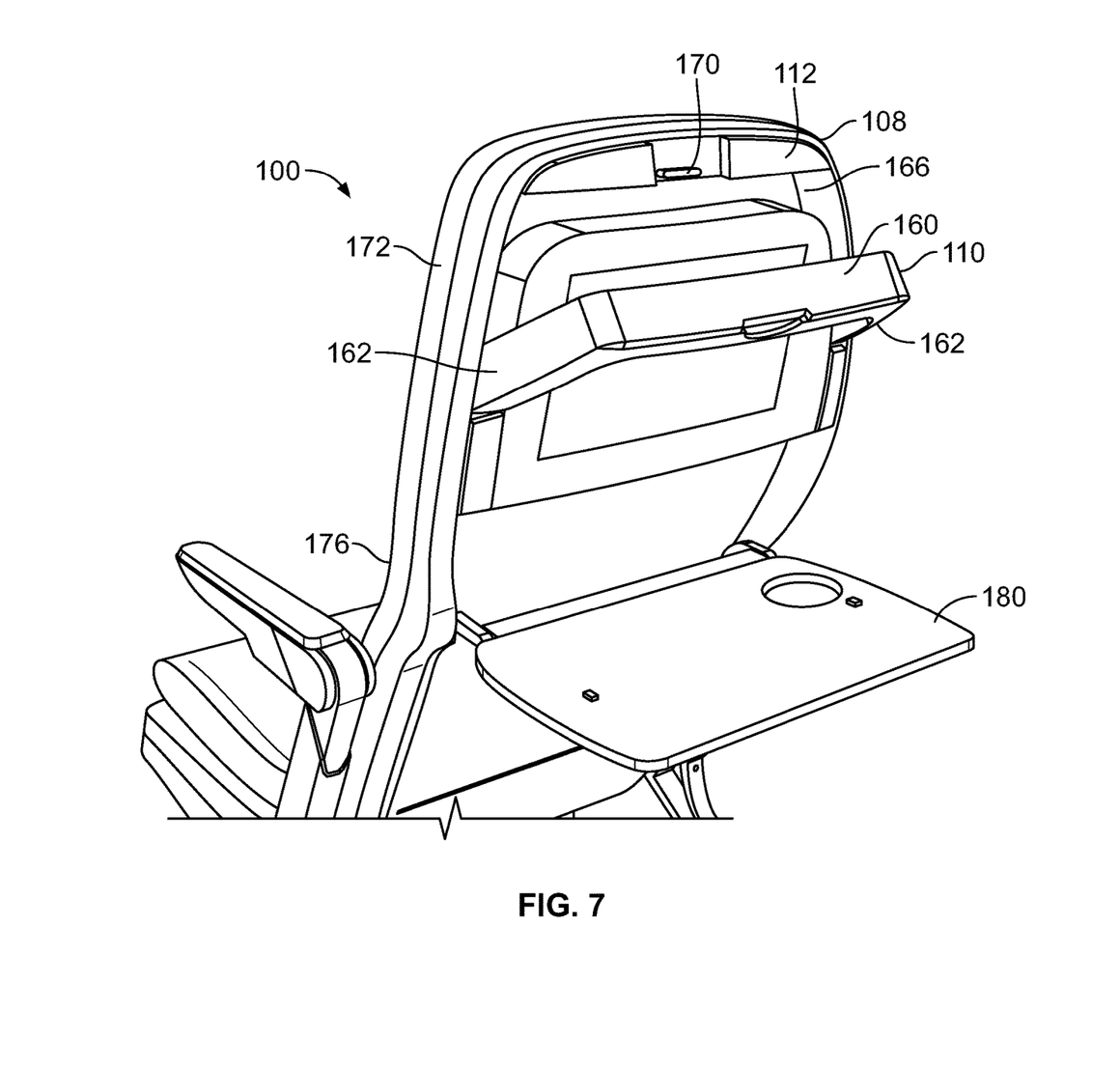
FIG. 7 illustrates a perspective rear view of a seat assembly having a headrest in a deployed position and a tray table in a deployed position, according to an embodiment of the present disclosure.

FIG. 7 illustrates a perspective rear view of the seat assembly 100 having the headrest 110 in a deployed position and the tray table 180 in a deployed position, according to an embodiment of the present disclosure. In order to move the headrest 110 into the deployed position, the latch 170 is pivoted into a position such that it no longer engages the head support beam 160. An individual then grasps a portion of the headrest 110 and pivots the headrest 110 downwardly into the deployed position, such as by the lateral pivot arms 162 downwardly pivoting in relation to the backrest 108. As shown, in the deployed position, the headrest 110 rearwardly extends from the back 112 of the backrest 108.

The headrest 110 may be held in a desired position. For example, the headrest 110 and/or the backrest may include one or more of a clutched or ratcheted locking mechanism, spring-biased pins, removable pins or fasteners, clamps, and/or the like that are configured to securely lock the headrest 110 into a desired deployed position.

Figure 8:
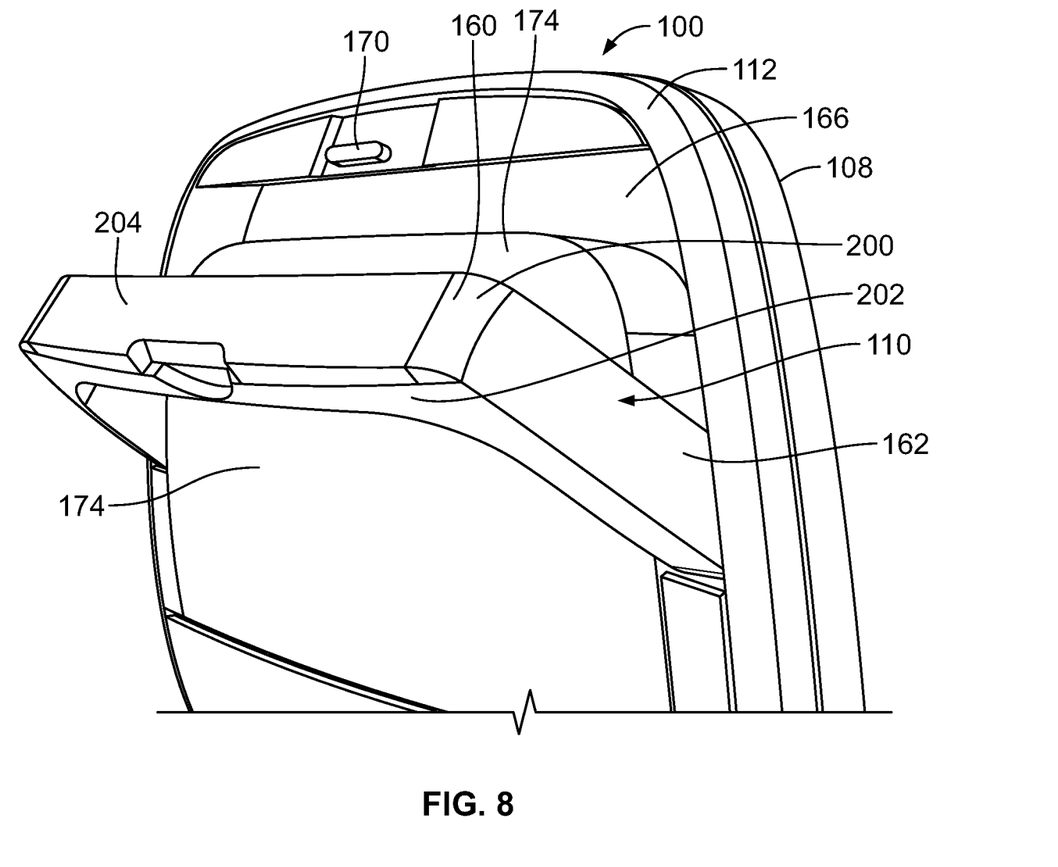
FIG. 8 illustrates a perspective rear view of a backrest of a seat assembly having a headrest in a deployed position, according to an embodiment of the present disclosure.

FIG. 8 illustrates a perspective rear view of the backrest 108 of the seat assembly 100 having the headrest 110 in a deployed position, according to an embodiment of the present disclosure. As shown, the headrest 110 pivots around the electronic device 174.

In at least one embodiment, the head support beam 160 includes a padded insert 200. The padded insert 200 may be formed of an open cell foam, and is configured to provide a comfortable, padded surface on which an individual may rest a portion of a face in a forward resting position. The padded insert 200 may be retained within a retaining bracket 202. The padded insert 200 may be removably coupled to the retaining bracket 202. In this manner, the padded insert 200 may be a disposable unit that is configured to be replaced after one or more uses. In at least one other embodiment, the padded insert 200 may be permanently fixed to the retaining bracket 202. As another example, the head support beam 160 may be formed of a padded material, such an open cell foam.

An antimacassar 204 may be secured over the padded insert 200. The antimacassar 204 may be draped over an outer surface of the padded insert 200. In at least one other embodiment, the antimacassar 204 may be removably secured to the padded insert 200, such as through Velcro or other such fastening agents. The antimacassar 204 may be disposable and configured to be removed and replaced after one or more uses. As such, a clean and sterile antimacassar 204 may be used by each passenger. Alternatively, the headrest 110 may not include the antimacassar 204.

Figure 9:
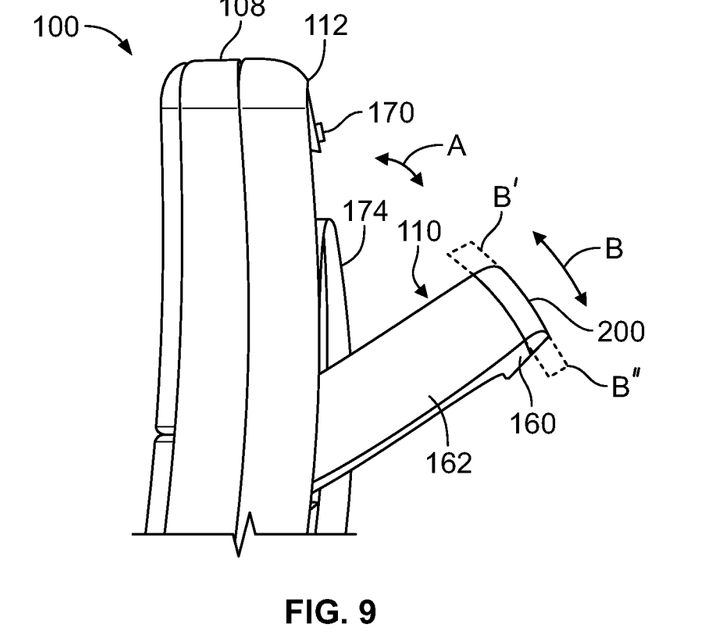
FIG. 9 illustrates lateral view of a backrest of a seat assembly having a headrest in a deployed position, according to an embodiment of the present disclosure.

FIG. 9 illustrates lateral view of the backrest 108 of the seat assembly 100 having the headrest 110 in a deployed position, according to an embodiment of the present disclosure. The headrest 110 is pivoted from the stowed position (as shown in FIGS. 4 and 5) into the deployed position. The headrest 110 may be positioned in a desired deployed position based on a pivot position of the lateral pivot arms 162 in relation to the backrest 108. The range of pivotal motion may extend from an upright position (in which the headrest 110 is stowed in the backrest 108), to a horizontal position that is ninety degrees from the upright position. Optionally, the range of pivotal motion may be greater or lesser than ninety degrees.

Additionally, the padded insert 200 may be radially shifted relative to the head support beam 160 in the directions of arc B. For example, the padded insert 200 may be upwardly shifted to a position B', or downwardly shifted to a position B". As such, the headrest 110 may be adjusted in relation to two degrees of freedom, namely with respect to the pivot arms 162 pivoting in relation to the backrest 108 in the directions of arc A, and with respect to the padded insert 200 shifting in relation to the head support beam 160 in the directions of arc B. Alternatively, the padded insert 200 may not be configured to be shifted in relation to the head support beam 160.

The headrest 110 and the padded insert 200 are adjustable, as described, regardless of the position of the seat assembly 100. For example, the backrest 108 may be adjusted to different reclining positions, while the headrest 110 and the padded insert 200 are adjustable as described at the various reclining positions. Deployment of the headrest 110 does not limit adjustability of the backrest 108, or vice versa.

Figure 10:
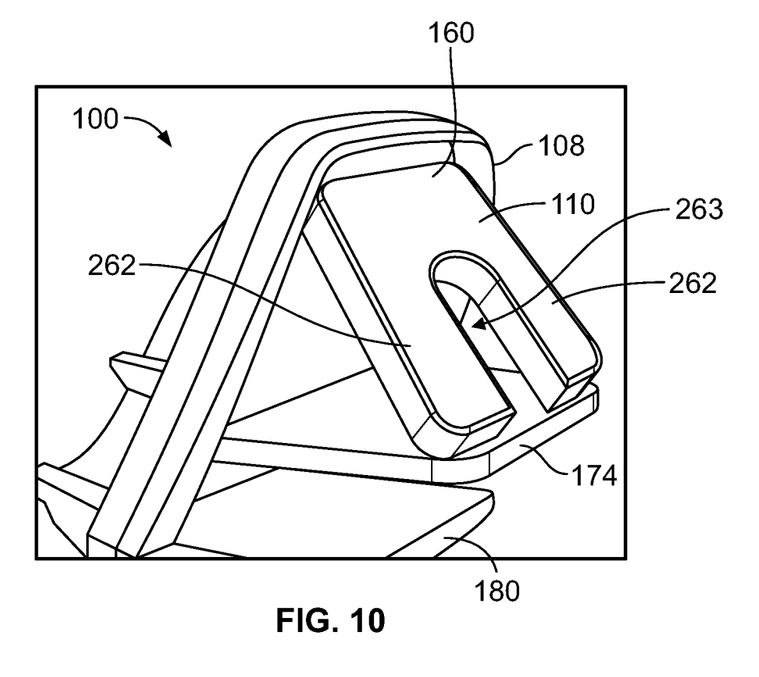
FIG. 10 illustrates a perspective rear view of a seat assembly having a headrest in a deployed position and a tray table in a deployed position, according to an embodiment of the present disclosure.

FIG. 10 illustrates a perspective rear view of a seat assembly 100 having a headrest 110 in a deployed position and a tray table 180 in a deployed position, according to an embodiment of the present disclosure. In this embodiment, the headrest 110 may be configured to pivot about an upper interface between the head support beam 160 and the backrest 108. Stabilizing beams 262 connected to the head support beam 160 swing outwardly, and may be supported on a rear surface of the electronic device 174, which has been downwardly folded about a pivot axle coupled to the headrest 110. The electronic device 174 may be configured to pivot about a lower interface that is below the upper interface. In the downwardly position, the electronic device 174 may be positioned over a deployed tray table 180. In the stowed position, the headrest 110 may be tucked behind the upwardly positioned electronic device 174

A space 263 may extend between the stabilizing beams 262, which are supported over the rear of the downwardly folded electronic device 174. An individual may position a face within the space 263 between the stabilizing beams 262. Optionally, the seat assembly 100 may not include the electronic device 174. Instead, the headrest 110 may be configured to be supported on the deployed tray table 180.

Figure 11:
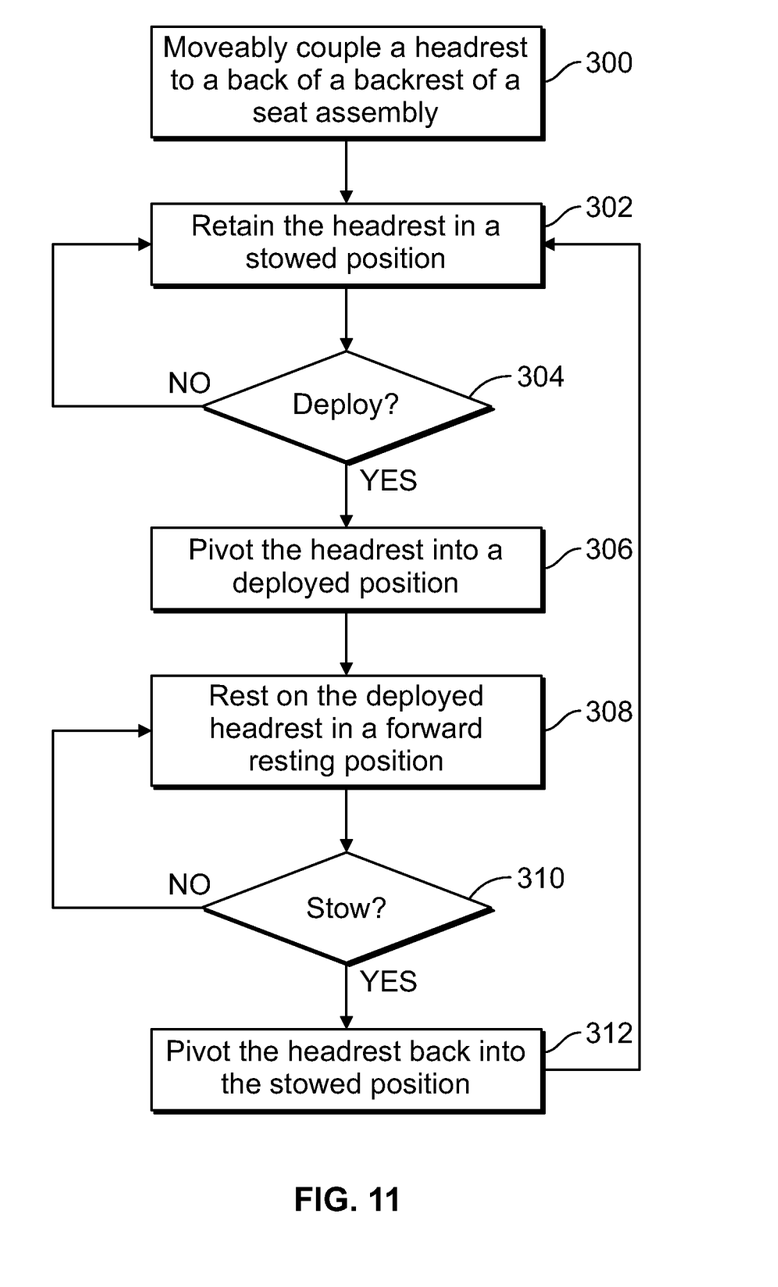
FIG. 11 illustrates a flow chart of a method of forming and/or operating a headrest of a seat assembly, according to an embodiment of the present disclosure.

FIG. 11 illustrates a flow chart of a method of forming and/or operating a headrest of a seat assembly, according to an embodiment of the present disclosure. Referring to FIGS. 1-11, the method begins at 300, at which the headrest 110 is moveably coupled to the seat assembly 100. For example, the headrest 110 may be moveably coupled to the back 112 of the backrest 108 of the seat assembly 100. At 302, the headrest 110 is retained in the stowed position.

At 304, an individual decides whether to deploy the headrest 110. If the individual does not wish to deploy the headrest 110, the method returns to 302.

If, however, the individual does wish to deploy the headrest 110, the headrest is pivoted into the deployed position at 306. The individual may then rest on the deployed headrest 110 in a forward resting position.

At 310, the individual decides whether or not to stow the headrest 110. If not, the method may return to 308.

If, however, the individual wishes to stow the headrest, the headrest 110 is pivoted backed into the stowed position at 312. The method then returns to 302.

In at least one embodiment, a method of forming a seat assembly includes moveably coupling the headrest to the seat assembly. The moveably coupling allows the headrest to be moved between a stowed position in which the headrest is retained within a portion of the backrest and a deployed position in which the headrest is configured to support a passenger in a forward resting position. The method may include retaining the headrest in the stowed position within an envelope of the backrest.

As described herein, embodiments of the present disclosure provide a seat assembly onboard a vehicle that allows a passenger to comfortably rest in a forward position. Further, embodiments of the present disclosure provide a seat assembly having a comfortable and clean deployable headrest.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A seat assembly comprising:
   a seat cushion;
   a backrest;
   a headrest moveably coupled to a back of the backrest, wherein the headrest is configured to be moved between a stowed position in which the headrest is retained within a portion of the backrest and a deployed position in which the headrest is configured to support a passenger in a forward resting position, wherein the headrest comprises a head support beam that spans between opposed lateral pivot beams, wherein the head support beam extends between upper ends of the lateral pivot beams, and wherein lower ends of the lateral pivot beams are pivotally coupled to the back of the backrest; and a tray table moveably coupled to the back of the backrest, wherein the headrest is moveable independently relative to the tray table.

2. The seat assembly of claim 1, wherein the headrest in the stowed position is retained within an envelope of the backrest.

3. The seat assembly of claim 1, wherein the headrest in the stowed position is flush mounted with the back of the backrest.

4. The seat assembly of claim 1, wherein the headrest in the stowed position is retained within a reciprocal retaining chamber formed in the back of the backrest.

5. The seat assembly of claim 1, wherein the headrest is moveably coupled to an upper portion of the back of the backrest.

6. The seat assembly of claim 1, further comprising a moveable latch that securely retains the headrest in the stowed position.

7. The seat assembly of claim 1, further comprising an electronic device secured within the back of the backrest.

8. The seat assembly of claim 7, wherein the headrest in the stowed position extends around one or more portions of the electronic device.

9. The seat assembly of claim 1, wherein the tray table is positioned below the headrest.

10. The seat assembly of claim 1, wherein the headrest comprises a padded insert.

11. The seat assembly of claim 10, wherein the padded insert is removably secured to a retaining bracket.

12. The seat assembly of claim 10, further comprising an antimacassar removably secured to the padded insert.

13. The seat assembly of claim 10, wherein the padded insert is configured to be radially shifted relative to a head support beam of the headrest.

14. The seat assembly of claim 1, wherein the headrest is pivotally coupled directly to the backrest.

15. A method of forming a seat assembly, the method comprising:
moveably coupling a headrest to a back of a backrest of the seat assembly, wherein the headrest comprises a head support beam that spans between opposed lateral pivot beams, wherein the head support beam extends between upper ends of the lateral pivot beams, wherein lower ends of the lateral pivot beams are pivotally coupled to the back of the backrest, wherein the moveably coupling allows the headrest to be moved between a stowed position in which the headrest is retained within a portion of the backrest and a deployed position in which the headrest is configured to support a passenger in a forward resting position; and
moveably coupling a tray table to the back of the backrest independent of the headrest such that the headrest is deployable without affecting use of the tray table.

16. The method of claim 15, further comprising retaining the headrest in the stowed position within an envelope of the backrest.

17. The method of claim 15, further comprising removably secured an antimacassar to a padded insert of the headrest.

18. The method of claim 15, further comprising radially shifting a padded insert of the headrest relative to the head support.

19. A vehicle comprising:
an interior cabin; and
a seat assembly within the interior cabin, wherein the seat assembly comprises:
a seat cushion;
a backrest;
a headrest moveably coupled to a back of the backrest, wherein the headrest is configured to be moved between a stowed position in which the headrest is retained within a portion of the backrest and a deployed position in which the headrest is configured to support a passenger in a forward resting position, wherein the headrest in the stowed position is retained within an envelope of the backrest, wherein the headrest in the stowed position is flush mounted with the back of the backrest, wherein the headrest in the stowed position is retained within a reciprocal retaining chamber formed in the back of the backrest, wherein the headrest is moveably coupled to an upper portion of the back of the backrest, wherein the headrest comprises a head support beam that spans between opposed lateral pivot beams, wherein the head support beam extends between upper ends of the lateral pivot beams, and wherein lower ends of the lateral pivot beams are pivotally coupled to the back of the backrest;
a moveable latch that securely retains the headrest in the stowed position;
an electronic device secured within the back of the backrest, wherein the headrest in the stowed position extends around one or more portions of an electronic device; and
a tray table moveably coupled to the back of the backrest, wherein the tray table is positioned below the headrest and the electronic device.

20. The vehicle of claim 19, wherein the headrest further comprises:
a padded insert removably secured to a retaining bracket of the head support beam, wherein the padded insert is configured to be radially shifted relative to a head support beam of the headrest; and
an antimacassar removably secured to the padded insert.

* * * * *